E. C. SHAW.
VEHICLE WHEEL RIM.
APPLICATION FILED MAY 22, 1909.
1,088,843.
Patented Mar. 3, 1914.
2 SHEETS—SHEET 1.
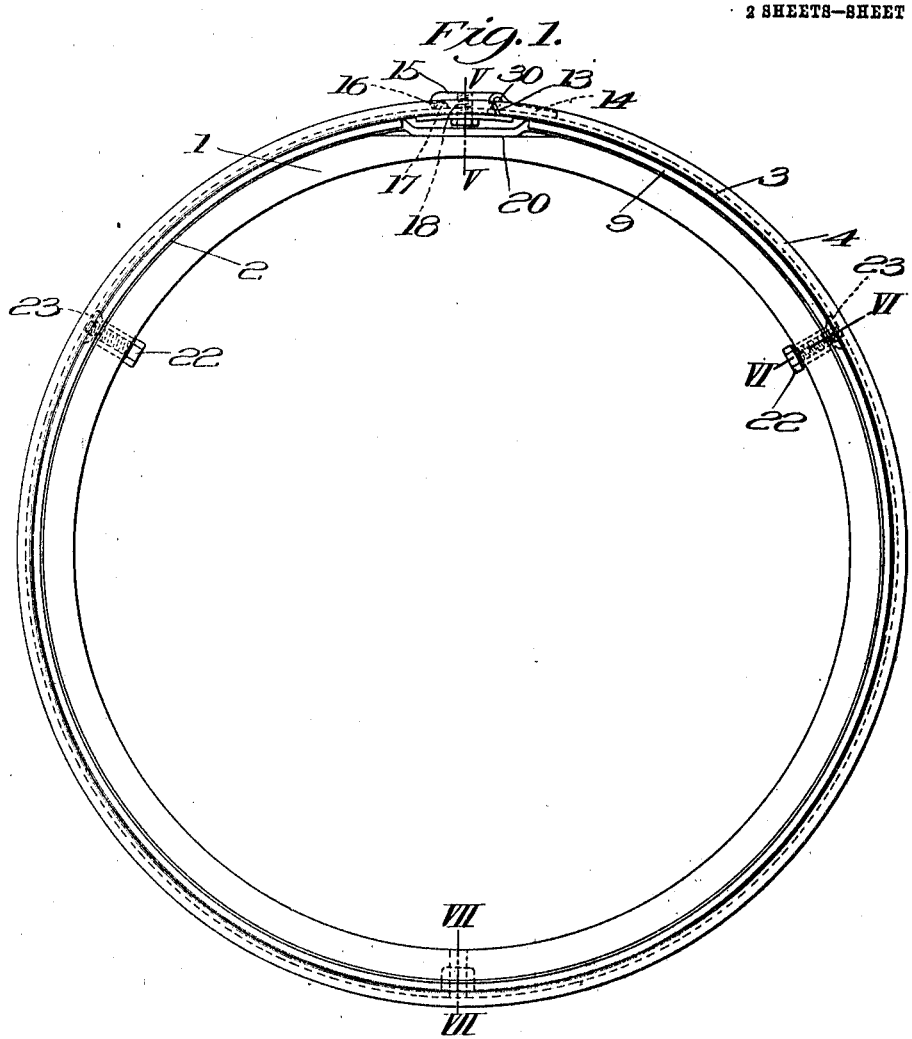
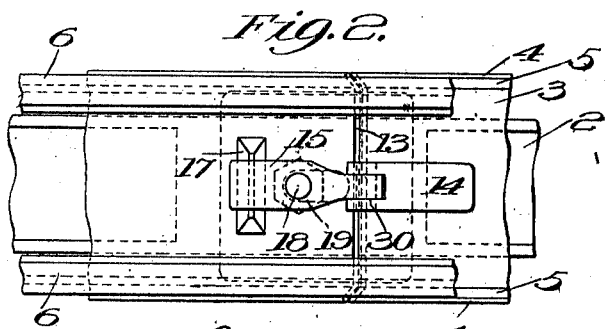
Witnesses:
Erwin Copland Shaw, Inventor
By his Attorney

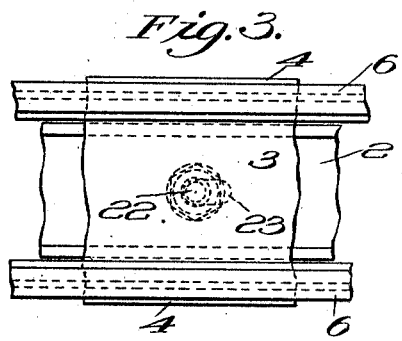
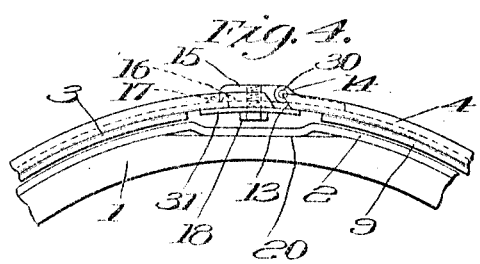
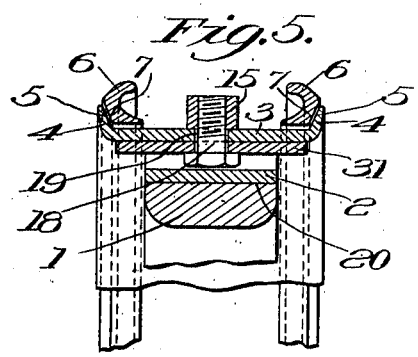
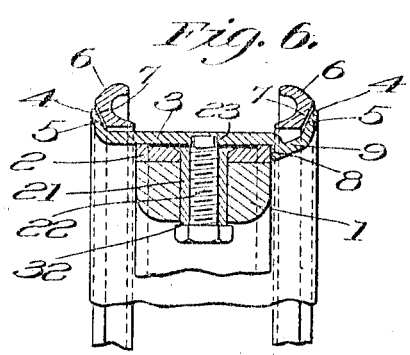
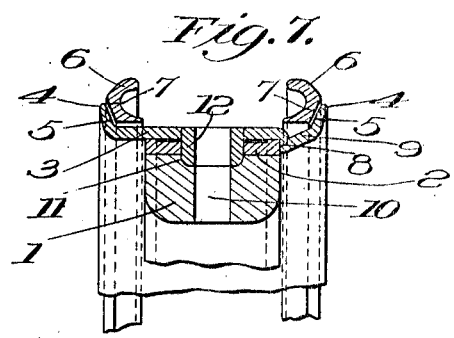

UNITED STATES PATENT OFFICE.

EDWIN C. SHAW, OF AKRON, OHIO, ASSIGNOR, BY MESNE ASSIGNMENTS, TO THE B. F. GOODRICH COMPANY, A CORPORATION OF NEW YORK.

VEHICLE WHEEL-RIM.

1,088,843.  Specification of Letters Patent.  Patented Mar. 3, 1914.

Application filed May 22, 1909. Serial No. 497,625.

*To all whom it may concern:*

Be it known that I, EDWIN C. SHAW, a citizen of the United States, and a resident of the city of Akron, in the county of Summit and State of Ohio, have invented certain new and useful Improvements in Vehicle Wheel-Rims, of which the following is a specification, reference being had to the drawings forming a part thereof.
My invention relates to demountable rims in which a rim member capable of holding an inflated tire, and which is so formed that it may be readily applied to and removed from a vehicle wheel, is used; the form herein shown and described being for a modification of the general type of structure forming the subject matter of my application Serial Number 375,716, filed May 25th 1907.
More specifically, this invention contemplates the provision of a split removable rim combined with detachable annular tire retaining flanges, the rim being capable of contraction to free it from the flanges and of expansion to cause it to clamp the flanges and hold itself, the flanges and the tire in a unitary self-contained structure in which the tire may be inflated and the whole carried from place to place ready to be immediately substituted for a damaged tire whenever necessary.

The invention contemplates the use of the air pressure within the tire for the clamping of the detachable rim upon the wheel, auxiliary means also being used for this purpose.

A latching device is preferably used in securing the ends of the split rim together; the construction of the latch being such that it may also be made to hold the ends of the rim a short distance apart, when it is to be placed upon the wheel. As will be obvious, some of the features of the invention may be used without others, as, for instance, the latching device, which is equally applicable to a split rim provided with integral tire retaining flanges.

In the accompanying drawings I have illustrated a preferred embodiment of my invention showing a rim adapted for holding a clencher tire, but I have chosen this form merely as an illustration, and it will be understood that the rim may be modified to hold a Dunlop, or other type of tire, or be changed in various other ways.

In these drawings Figure 1 is a side elevation of a wheel felly, with a rim embodying my invention applied thereto, the endless tire retaining flanges being omitted.
Fig. 2 is a plan view on an enlarged scale, of a portion of the rim, showing the latch mechanism. Fig. 3 is a plan view of a portion of the rim showing in dotted lines a screw for preventing lateral displacement of the rim. Fig. 4 is a view similar to Fig. 1, of a portion of the rim and felly, the latch being adjusted to hold the ends of the split rim member apart. Fig. 5 is a section on the line V—V of Fig. 1, showing also the endless tire retaining flanges. Fig. 6 is a section on the line VI—VI, and Fig. 7 a section on the line VII—VII of Fig. 1.

Referring to the drawings in detail, the numeral 1 designates the wheel felly upon which is preferably shrunk or otherwise secured a rim member 2.

3 is the split detachable rim provided with the flanges 4 having the outwardly inclined faces 5 for retaining the endless tire flanges 6 in place. These flanges are provided with inclined outer faces 7, for engagement with the faces 5. The split rim 3 is also provided with an inwardly projecting rib or shoulder 8, preferably formed by an off-set 9, which abuts against the edge of the felly or fixed rim member and serves to locate the detachable rim properly with reference thereto. An opening 10 for the valve-stem of the tire is formed through the felly, preferably diametrically opposite to the point where the rim is split, said opening being enlarged at 11, to form a socket for the bushing 12, carried by the detachable rim. The rim 3 is split at 13, and is provided with some means for securing the ends together or holding them apart. In the form illustrated this means comprises a bracket 14 secured to one end of the rim to which is pivoted at 30, the latch 15. The latch is provided with a transverse groove 16 near its outer end, which engages with the pyramidal lug 17, formed upon the other end of the split rim. The latch 15 is designed to cover the lug 17 as shown in Figs. 1 and 2, when the split rim is in place, in order to positively hold the ends of the latter together, or to engage the outer edge of the lug 17, as shown in Fig. 4, when it is desired to hold the ends of the rim a slight distance apart in order to enlarge the diameter of the rim sufficiently to permit it to slip easily over the felly and fixed band 2. For holding the latch 15 in engagement with the lug 17 in either of the positions shown in Figs. 1 and 4, I provide a cap screw 18, screwing into an internally threaded hole in the latch and engaging with a tongue 31, preferably secured to the end of the rim carrying the lug 17.

19 is a slot formed in the detachable rim through which the bolt 18 passes. I prefer to place the set screws 22 at two or more points in the circumference of the wheel for engagement with slots 23 in the detachable rim, in order to secure the latter against the possibility of lateral displacement. These set screws preferably screw into internally threaded bushings 21, passing through suitable openings in the felly. The ends of the bushings projecting slightly above the face of the felly as shown at 32, form seats for the heads of the screws 22 to limit the inward movement of the latter. The slots 23 in the rim member are preferably slightly elongated, as shown in Fig. 2, and formed of a width to closely engage the reduced end portions of the screws 22. A recess 20, is preferably formed in the fixed portion of the rim, opposite the opening in the valve-stem to make room for the tongue 31 and head of cap screw 18, and also to provide sufficient space for the ready manipulation of this cap screw.

The method of operation of my rim and of the assembling of the parts, is as follows: The split rim 3 being removed from the wheel, and the cap screw 18 being unscrewed from the latch 15, the ends of the split rim are lapped by each other until the diameter of the latter is reduced sufficiently to permit one of the endless flanges 6 to be slipped over a flange 4. The tire is then placed upon the split rim while it is still contracted, and after the tire of the second endless flange 6 is put on. The rim is then expanded within the tire and flanges until its ends are a slight distance apart, as shown in Fig. 4, when the cap screw is screwed into the latch 15, holding the latter down and in engagement with the edge of the lug 17. The split rim is now firmly locked in this slightly expanded position and the tire may be fully inflated. The split rim and tire are now ready for application to the wheel, and this is done by simply slipping the valve-stem through the opening 10, and sliding the rim over the wheel until the shoulder 8 abuts against the side of the latter. The cap screw 18 is then unscrewed from the latch 15 sufficiently to permit the latter to slide over the lug 17, which it will do as soon as it can under the violent contractive force of the inflated tire. The ends of the split rim will then be brought together and the rim seated very firmly on the wheel where it will be held by the pressure of the inflated tire. The cap screw 18 is then screwed up and the latch 15 held in engagement with the lug 17 in the position shown in Figs. 1 and 2, thus locking the ends of the rim against displacement. Screws 22 are then screwed in until their heads engage the heads of the bushings 21, thus furnishing additional means for preventing the displacement of the rim. The contractual effect produced by the air pressure in the tire is very considerable and is ample to lock the split rim in place and its effect is aided by the spreading of the endless flanges 6 apart by the inflated tire, which causes a wedging action to take place between the inclined surfaces 5 and 7. The effect of this wedging action is to insure the proper centering of the endless flanges and to increase the grip of the split rim on the wheel. To remove the rim and tire it is simply necessary to deflate the latter and unscrew the cap screw 18, when the flange can be readily expanded sufficiently to permit its removal. The set screws 22 will, of course, be withdrawn before this is done.

Having thus described my invention, I claim:

1. In a vehicle wheel rim in combination, a fixed member, a split detachable member, a latching member movable into position to lock the ends of the split member together or in a separated position, and a screw for holding said latching member in either of said positions.

2. In a vehicle wheel rim in combination, a fixed member, a split detachable rim member carrying tire retaining means, a latch on one end of said split rim member, means on the other end of said split rim member adapted to be engaged by said latch, and a screw passing through a slot in the last named end of said rim member, engaging a threaded opening in the latch.

3. In a vehicle wheel rim in combination, a fixed member, a split detachable rim member, a bracket carried by one end of said split member, a latch pivoted to said bracket to swing in the plane of the wheel, said latch being provided with a transverse groove in its under surface near its outer end, a pyramidal lug formed upon the other end of said split member adapted to be engaged by said latch, and a cap screw engaging with a threaded opening in the latch and acting to secure the latter in engagement with said lug.

4. In a vehicle wheel rim in combination, a fixed member, and a split detachable rim member having a portion offset from the body thereof without thickening the metal forming an annular shoulder for engagement with the side of the fixed member, and having a substantially cylindrical inner surface extending from said offset to the edge of said member, a portion of said surface adjacent to said offset seating upon said fixed member.

5. In a vehicle wheel rim in combination, a fixed member, a split detachable rim member, said fixed member being provided with opening for the valve-stem of a tire, said opening being enlarged at its outer end into a shallow recess and a short bushing carried by the split detachable member projecting inwardly therefrom and adapted to be inserted endwise into said opening in said fixed member.

6. In a vehicle wheel rim, in combination, a fixed member, a detachable rim member, said fixed member being provided with an opening for the valve-stem of a tire, said opening being enlarged at its outer end into a shallow recess, and a short bushing carried by the detachable member projecting inwardly therefrom and adapted to be inserted endwise into said opening in said fixed member.

7. In a vehicle wheel rim, in combination, a fixed member, a detachable rim member, said fixed member being provided with an opening for the valve-stem of a tire, and a short bushing carried by the detachable member projecting inwardly therefrom and adapted to be inserted endwise into said opening, the walls of said bushing at the inner end thereof being rounded or tapered.

8. In a vehicle wheel rim in combination, a wheel felly, a bushing extending radially therethrough and projecting inwardly slightly beyond the surface of said felly, a detachable rim member adapted to be seated upon said felly, and a set screw screwing into said bushing and adapted to engage with said detachable rim member, the inner end of said bushing engaging the head of said set screw and limiting the inward movement thereof.

EDWIN C. SHAW.

Witnesses:
WALTER K. MEANS,
ROBERT W. AITKEN.